H. F. FOSTER.
CHUCK.
APPLICATION FILED SEPT. 17, 1918.
1,292,747.
Patented Jan. 28, 1919.
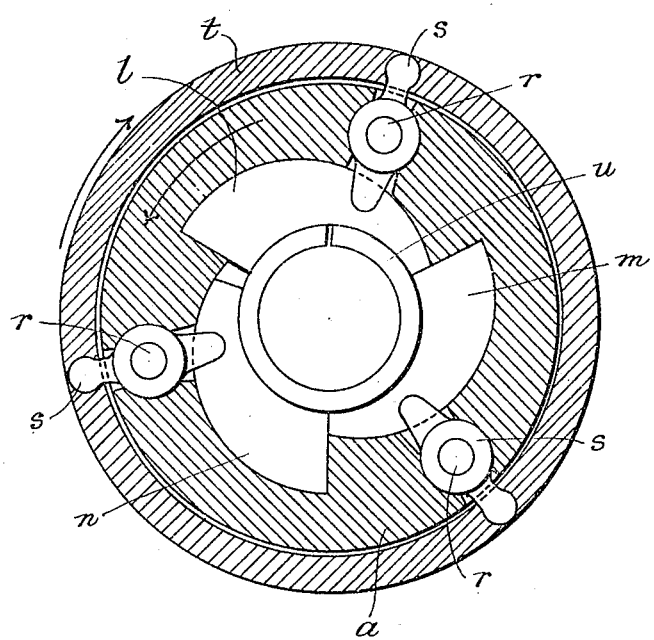
Inventor.
H. F. Foster.
By H. R. Kerslake
Atty.

UNITED STATES PATENT OFFICE.

HERBERT FRASER FOSTER, OF EPSOM, ENGLAND.

CHUCK.

1,292,747.      Specification of Letters Patent.      Patented Jan. 28, 1919.

Application filed September 17, 1918. Serial No. 254,508.

*To all whom it may concern:*

Be it known that I, HERBERT FRASER FOSTER, a subject of the King of Great Britain and Ireland, and residing at Stanley House, Epsom, in the county of Surrey, England, have invented certain new and useful Improvements in Chucks, of which the following is a specification.

The present invention relates to improvements in chucks of the self-centering type.

The present invention consists in a chuck having two or more jaws fitting within eccentric circular spaces in the chuck, the jaws being adapted to be pressed together on to the work and released by suitable means.

The invention further consists in means for positively opening and closing the jaws on the work.

The invention further consists in the improved form of chuck hereinafter described.

In the accompanying drawing I have shown a sectional view of a chuck constructed according to the invention.

In carrying the invention into effect, the chuck is formed with a plurality of eccentric circular spaces in which a plurality of jaws slide, these jaws being in the form of wedges, each of which occupies one of the circular spaces, these spaces being formed so that the thin end of each jaw is adjacent to the thick end of an adjacent jaw. A space is allowed for between the thin end of one jaw and the thick end of another jaw, so that when one or all of the jaws is or are rotated relatively to the chuck through a short distance in the direction of the smaller end or ends, a wedging action takes place causing the space within the jaws to be contracted so that the jaws grip the work placed in the chuck.

According to the invention three jaws are employed, each extending over an angle of 120°. With jaws sub-divided in this manner a better balance is obtained.

Referring to the drawing, the chuck *a* is formed with three eccentric circular spaces in which three jaws *l*, *m* and *n* slide, these jaws being in the form of wedges each of which occupies one of the eccentric circular spaces. The spaces are so formed that the thin ends of the jaws are adjacent to the thick ends of the adjacent jaws.

In the form of the invention shown three closing levers S are provided, one for each jaw and the outer ends of these levers are engaged with a ring *t*. An internal spring *u* is provided adapted to press the jaws outward.

The levers are pivoted on pivots *r* which extend parallel to the axis of the chuck.

It will be seen that when the ring *t* is turned relatively to the chuck body in the direction shown by the arrow, the jaws will be opened.

Having now described my invention, what I claim as new and desire to secure by Letters Patent is:—

A chuck comprising a socket having a plurality of eccentrically arranged internal faces, a plurality of eccentric wedges located in said socket and having eccentric outer faces engaging the eccentric faces of the socket and concentric inner faces adapted to grip the tool to be held, levers extending substantially radially through said socket and fulcrumed on pivots extending parallel to the axis of the socket, the inner ends of said levers operatively engaging said wedges for operating the latter, and a ring surrounding said socket and engaging the outer ends of said levers for simultaneously operating the levers.

In testimony whereof I have signed my name to this specification.

HERBERT FRASER FOSTER.

Copies of this patent may be obtained for five cents each, by addressing the "Commissioner of Patents, Washington, D. C."